No. 654,179. Patented July 24, 1900.
A. W. PONTON.
ROLLER BEARING.
(Application filed Aug. 8, 1899.)
(No Model.)

Witnesses
G. J. Colbourne.
J. W. Webster.

Inventor
Archibald W. Ponton
by Ridout & Maybee
Atty's

THE NORRIS PETERS CO., PHOTO-LITHO., WASHINGTON, D. C.

UNITED STATES PATENT OFFICE.

ARCHIBALD W. PONTON, OF OTTAWA, CANADA.

ROLLER-BEARING.

SPECIFICATION forming part of Letters Patent No. 654,179, dated July 24, 1900.

Application filed August 8, 1899. Serial No. 726,563. (No model.)

*To all whom it may concern:*

Be it known that I, ARCHIBALD WILLIAM PONTON, civil engineer, of Parliament Buildings, in the city of Ottawa, in the county of Carleton and Province of Ontario, Canada, have invented certain new and useful Improvements in Ball or Roller Bearings, of which the following is a specification.

The object of my invention is to devise a ball or roller bearing for bicycles and other purposes which will entirely obviate all rubbing friction on the cups and cones or of the balls or rollers on one another; and it consists, essentially, in the use of a retainer in which the balls or rollers are journaled each on an axial line coincident with that on which its contact with the ball cup and cone tends to revolve it, and of such details of construction as are hereinafter more specifically described and then definitely claimed.

Figure 1:
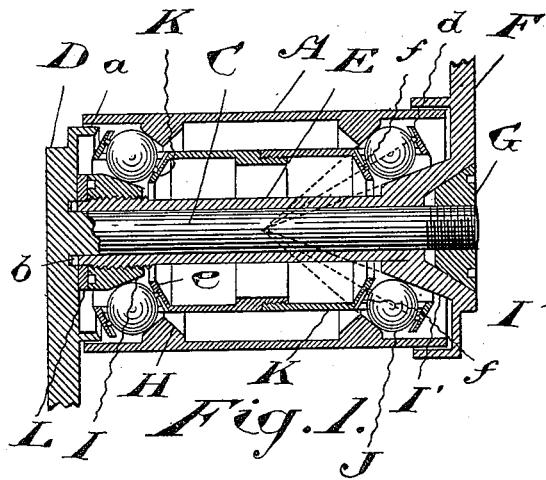
Figure 2:
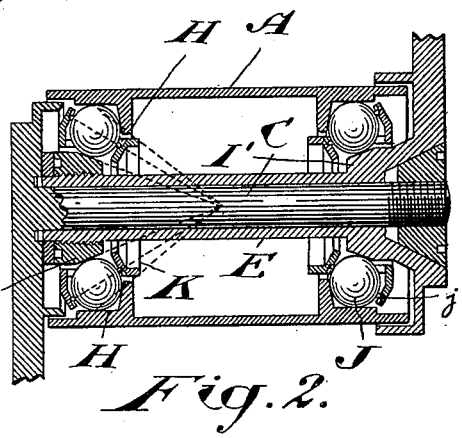
Figure 4:
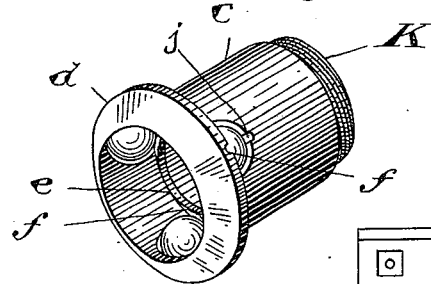
Figure 5:
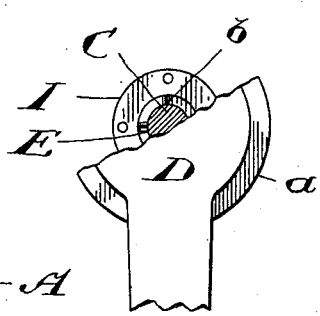
Figure 3:
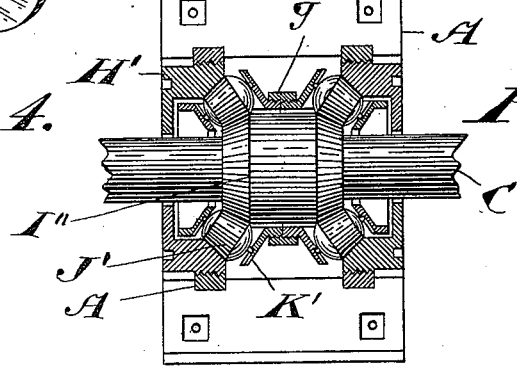

Figure 1 is a longitudinal section showing my improvements applied to a two-point bearing. Fig. 2 is a similar view showing my improvements applied to a three-point bearing. Fig. 3 is a similar view showing my improvements applied to a bearing for machinery. Fig. 4 is a perspective view of a ball-retainer. Fig. 5 is a sectional elevation, partly broken away, showing a portion of the crank which is connected to the axle and the adjusting-cone.

In the drawings like letters of reference indicate corresponding parts in the different figures.

A is a hub or casing, and C the axle. D is a crank formed integral with the axle and provided with the dust-band $a$, projecting within the end of the casing A.

E is a sleeve embracing the axle and formed integral with the crank F. This sleeve has projections $b$ formed thereon, which are adapted to engage suitable recesses in the crank D. (See Figs. 1 and 5.) G is a nut screwed upon the end of the axle C and shaped as the frustum of a cone, so as to engage the sides of a similar-shaped recess in the crank F. It is provided with suitable holes for engagement by a spanner, so that by screwing it up tightly the sleeve and the axle may be rigidly clamped together. At each end of the casing ball-cups H are provided, formed on or secured thereto.

I I' are the ball-cones, I being the adjusting-cone screwed upon the sleeve E in proximity to the crank D, and I' a stationary cone formed integral with or secured to the sleeve E in proximity to the crank F. These cones form, with the opposed cones, races for the balls J.

In Fig. 1 it will be seen that the ball-cup H and cone on each end form the frustums of cones which, if extended, would have common apexes at a point in the axis of the axle. In order that the balls shall produce no rubbing friction, it is necessary that they shall revolve on an axis the extension of which will intersect the common apex of the cones of which the ball cup and cone are frustums. I therefore provide each ball with an axle, preferably formed by turning rounded gudgeons $j$ at diametrically-opposite points on the surface thereof and journaling these gudgeons in a retainer K, so that the ball revolves on an axis intersecting the axis of the axle at the point previously described. The retainers K each comprise a sleeve $c$, having openings therein for the balls J. At one side of these openings is formed the external flange $d$, and at the other side the internal flange $e$. At each opening radial grooves $f$ are cut in the flanges from the outside down to suitable points to give the gudgeons a bearing in the line desired. These grooves are sufficiently shallow and the gudgeons sufficiently long to maintain the ball J entirely out of contact with the retainer. When a two-point bearing is used, as shown in Fig. 1, there is necessarily a slight outward pressure upon each ball which has to be taken up by the end of the outer gudgeon, and it is therefore important that only the rounded end of the gudgeon be in contact with the retainer, as contact of the ball with the retainer would result in considerable rubbing friction. If a three-point bearing is used, as shown in Fig. 2, the end pressure on the outer gudgeon does not exist. If such a three-point bearing is used, it is essential that the two lines of contact of the ball with the cup lie on the surface of a cone having a common apex with the cone of which the ball-cone is a frustum. This common apex lying, as in the two-point bearing, in the axis of the axle, the balls must of course be journaled on an axis including this common apex. When the outward pressure of the balls or rollers on the retainer through their gudgeons exists, as in Figs. 1 and 3, it is necessary that the retainers be connected together, which is preferably done by adapting the sleeve of one to screw within the sleeve of the other, a suitable shoulder being formed to act as a stop.

In the bearing shown in Fig. 3 coned rollers J' are provided, so as to give a greater bearing against the cups H' and cones I''. The cups H' also are faced inwardly instead of outwardly; but the principle of construction is substantially the same, with the exception that the cups are removable and adjustable and that the retainers are held together by the screw-threaded ring g. In Figs. 1 and 2 a washer L is shown between the adjustable cone and the crank. When it is desired to adjust the bearing, the nut G is unscrewed and the axle C removed with the crank D. After adjusting the cone I the washer and the axle and crank are replaced. Then by screwing up the nut G the adjusting-cone, washer, and crank D are tightly jammed together to hold the cone as adjusted. The projections b on the sleeve enter the recess in the crank D sufficiently far to prevent the sleeve and axle from rotating upon one another, but not sufficiently far to prevent the longitudinal adjustment of the sleeve upon the axle when the position of the adjusting-cone is altered in the operation of adjusting the bearing.

Although I use the term "roller" in my claims, I intend it to include the balls, as well as the rollers, and although I show only three in each race more may be used, if desired.

From the above description it will be seen that I have devised a bearing which is constructed in accordance with the accepted principles of mechanics and that there will be no rubbing action of the balls upon one another nor upon the cups and cones.

The balls or rollers having contact with the retainer at the ends of their axles only are free to roll without rubbing against the retainer.

The retainer, while meeting the purposes for which it is intended, is simple, compact, strong, and durable, and occupying a small space enables the hub or casing to be reduced to the smallest possible dimensions.

The retainer from its peculiar construction prevents the ball and gudgeons, although not permanently journaled or pivoted, getting out of their proper position relative to the other related parts.

What I claim as my invention is—

1. In a bearing, an axle and a hub or casing, opposed cups and cones forming races in combination with a retainer located in each race between said axle and the hub or casing; and a plurality of rollers for each race, each provided with an axle or gudgeons, the retainer being provided with radial grooves to receive each of the said axles or gudgeons, the said grooves being extended down to a suitable point to give each axle or gudgeon a bearing on an axial line substantially identical with the axis on which contact with the cup and cone tends to rotate the roller substantially as and for the purpose specified.

2. In a bearing, an axle and a hub or casing, opposed cups and cones forming races in combination with a retainer located in each race between said axle and the hub or casing; a plurality of rollers for each race, each provided with an axle or gudgeons, the retainer being provided with radial grooves to receive each of the said axles or gudgeons the said grooves being extended down to a suitable point to give each axle or gudgeon a bearing on an axial line substantially identical with the axis on which contact with the cup and cone tends to rotate the roller; and a sleeve rigidly connecting the retainers substantially as and for the purpose specified.

3. In a bearing, an axle, a cone at each end of said axle; and a casing or hub, cups opposed to the said cones to form races, the cup and cone at each end being the frustums of cones having a common apex in the axis of the axle, in combination with a set of rollers for each race; a retainer located in each race in which each roller is journaled by means of a suitable axle or gudgeons so that it is held out of contact with the retainer and so that its axial line intersects the common apex of the cones of which the cup and cone of the said race are frustums; and a sleeve connecting the said retainers substantially as and for the purpose specified.

4. In a bearing a retainer comprising a sleeve with openings therein for rollers; an external flange formed thereon at one side of the openings; and an internal flange at the other side of the said openings, in combination with a series of rollers each provided with an axle or gudgeons independently journaled in the said external and internal flanges, substantially as and for the purpose specified.

5. In a bearing a retainer comprising a sleeve with openings therein for the rollers; an external flange formed thereon at one side of the openings; and an internal flange at the other side of the said openings in combination with a series of rollers each provided with an axle or gudgeons, grooves being cut in the said flanges down to a point desired for the bearings for the said axle or gudgeons substantially as and for the purpose specified.

6. In a bearing a retainer comprising a sleeve with openings therein for the rollers, an external flange formed thereon at one side of the openings, and an internal flange at the other side of the said openings, in combination with a series of rollers each provided with an axle or gudgeons with rounded ends grooves being cut in the said flanges down to suitable bearings the axle ends or gudgeons being sufficiently long to prevent the rollers touching the flanges, substantially as and for the purpose specified.

Toronto, Canada, July 22, 1899.

ARCHIBALD W. PONTON.

In presence of—
J. EDW. MAYBEE,
A. J. COLBOURNE.